(12) United States Patent
Buck

(10) Patent No.: US 9,071,627 B2
(45) Date of Patent: Jun. 30, 2015

(54) METHOD AND SYSTEM FOR CLONING APPLICATIONS FROM AN ELECTRONIC SOURCE DEVICE TO AN ELECTRONIC TARGET DEVICE

(71) Applicant: Lookout, Inc., San Francisco, CA (US)

(72) Inventor: Brian James Buck, Livermore, CA (US)

(73) Assignee: LOOKOUT, INC., San Francisco, CA (US)

( * ) Notice: Subject to any disclaimer, the term of this patent is extended or adjusted under 35 U.S.C. 154(b) by 213 days.

(21) Appl. No.: 13/692,858

(22) Filed: Dec. 3, 2012

(65) Prior Publication Data

US 2014/0156784 A1 Jun. 5, 2014

(51) Int. Cl.
*G06F 13/00* (2006.01)
*H04L 29/08* (2006.01)
*H04W 4/00* (2009.01)

(52) U.S. Cl.
CPC ............ *H04L 67/1095* (2013.01); *H04L 67/34* (2013.01); *H04W 4/001* (2013.01); *H04W 4/003* (2013.01)

(58) Field of Classification Search
CPC .............. H04L 29/08072; H04L 29/06; H04L 29/0809; H04L 29/08981; H04L 67/1095; H04L 67/34; G06Q 30/02; H04W 4/001; H04W 4/003

USPC .................................. 709/217; 717/174, 175
See application file for complete search history.

(56) References Cited

U.S. PATENT DOCUMENTS

| 8,473,943 | B2* | 6/2013 | Dujmovic | 717/175 |
| 2005/0278338 | A1* | 12/2005 | Todorova et al. | 707/10 |
| 2008/0082955 | A1* | 4/2008 | Andreessen et al. | 717/100 |
| 2010/0057787 | A1* | 3/2010 | Gnech et al. | 707/204 |
| 2010/0325500 | A1* | 12/2010 | Bashir et al. | 714/746 |
| 2012/0311115 | A1* | 12/2012 | Kennedy et al. | 709/222 |
| 2013/0041790 | A1* | 2/2013 | Murugesan et al. | 705/30 |

* cited by examiner

*Primary Examiner* — Robert B Harrell
(74) *Attorney, Agent, or Firm* — Dergosits & Noah LLP

(57) ABSTRACT

Security is enhanced for a user of electronic devices by providing a method for providing an application to an electronic device. According to an embodiment, an application in a source electronic device can be cloned from the source electronic device to a target electronic device. According to an embodiment, when the application is selected, the source device can be configured to automatically collect the selected application and configuration information, state information and/or application data associated with the selected application. The collected information is referred to as "cloning data." Once the cloning data is collected, the source device can be configured to transmit at least a portion of the cloning data to the target electronic device, which can utilize the cloning data to clone the application into the target electronic device.

48 Claims, 7 Drawing Sheets

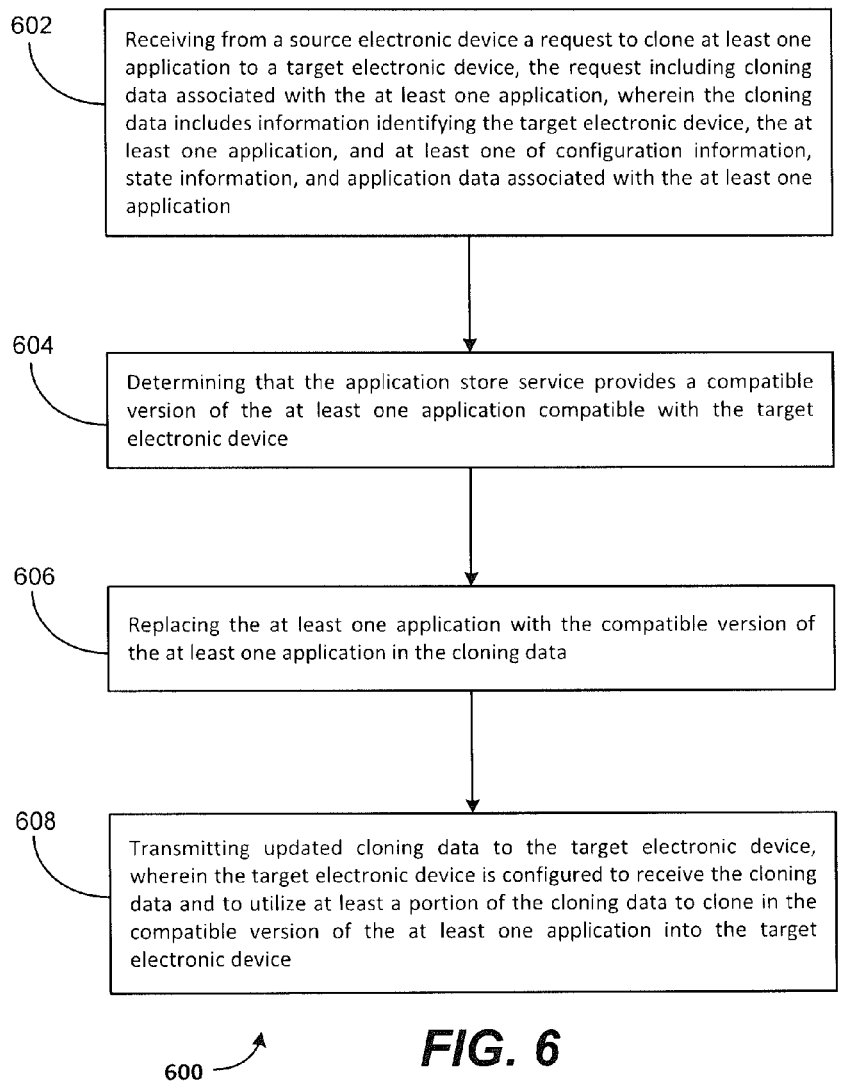

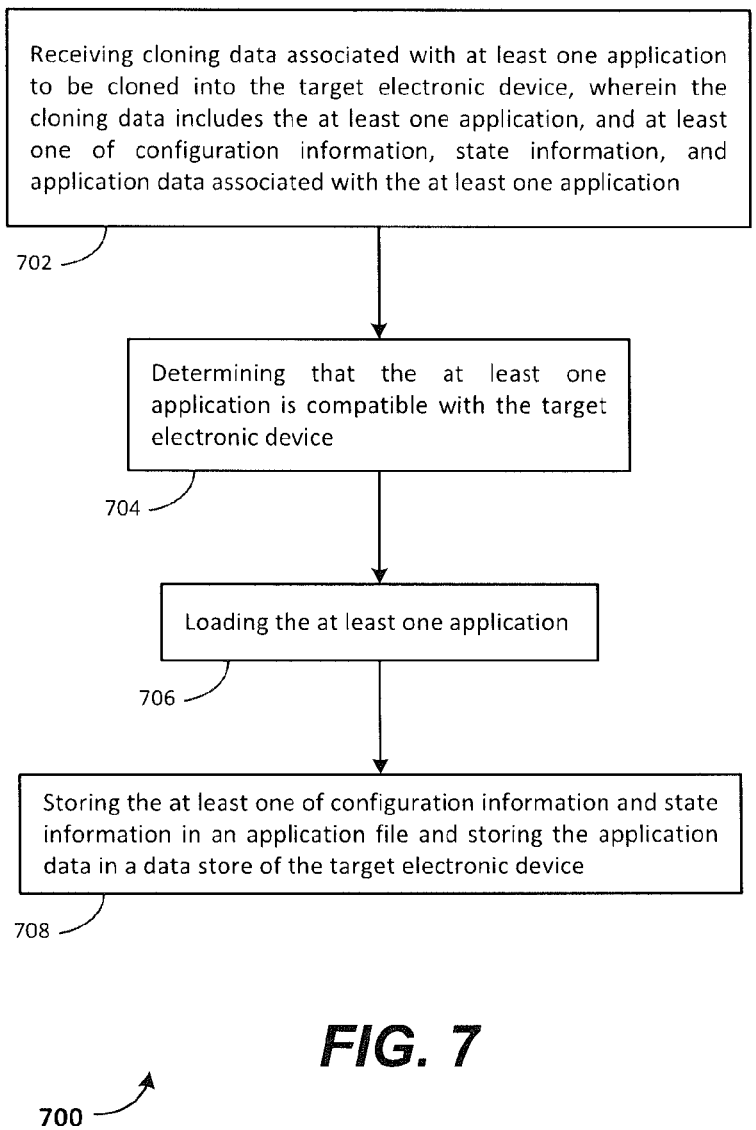

METHOD AND SYSTEM FOR CLONING APPLICATIONS FROM AN ELECTRONIC SOURCE DEVICE TO AN ELECTRONIC TARGET DEVICE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more embodiments relate generally to electronic devices and more specifically to systems and methods for providing and/or synchronizing applications between at least two electronic devices to enhance user security.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Electronic devices are prevalent in most countries throughout the world. More and more of the simplest devices are supporting multiple functions, from making phone calls and playing games, to browsing the Internet and revising documents. Indeed, with the proliferation of public and private Wi-Fi networks, many mobile electronic devices are highly complex multifunctional devices with capabilities rivaling those of desktop or laptop computers. For example, in addition to voice communications, many mobile electronic devices are capable of text messaging, e-mail communications, internet access, and running full-featured application software.

New devices are continuously being introduced, and it is common for an individual to own more than one electronic device that can perform similar functions. For example, a person can have a smartphone for personal use and a smartphone for work. The two smartphones can be operating on the same platform, e.g., "Android," or on different platforms, e.g., "Android" and "iOS." In addition, the same person can own at least one tablet computer and a network enabled MP3 player that share versions of some of the applications operating in the smartphones. For example, a game application can be installed on one or both of the smartphones and on the tablet computer. In this way, the person can enjoy the game wherever she is and on whatever device she may be using.

When a device owner obtains a new electronic device, e.g., as a replacement for, or in addition to having an existing device, some of the applications running on the existing device are often loaded onto the new device. The process of loading an application on an electronic device usually involves logging into an application store service that supports the application, searching for the application, and then downloading and installing the application on the electronic device. Once the application is loaded, the owner must often configure it to operate in a preferred manner. For example, if the application has an interface that can be partially customized by the user, the device owner may want to customize the interface of the application in the new device in the same way the application is customized in the existing device.

This process can be tedious and time consuming for a single application, let alone several applications. Moreover, even when the applications are installed and configured in the new device, none of the application data, e.g., high scores, avatar names, historical data, is available, and therefore, the device owner must recreate, e.g., replay lower levels of a game, or reenter the application data.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 6 is an operational flow diagram illustrating another exemplary method for cloning out an application according to another embodiment; and FIG. 7 is an operational flow diagram illustrating an exemplary method for cloning in an application according to an embodiment.

DETAILED DESCRIPTION

Figure 1:
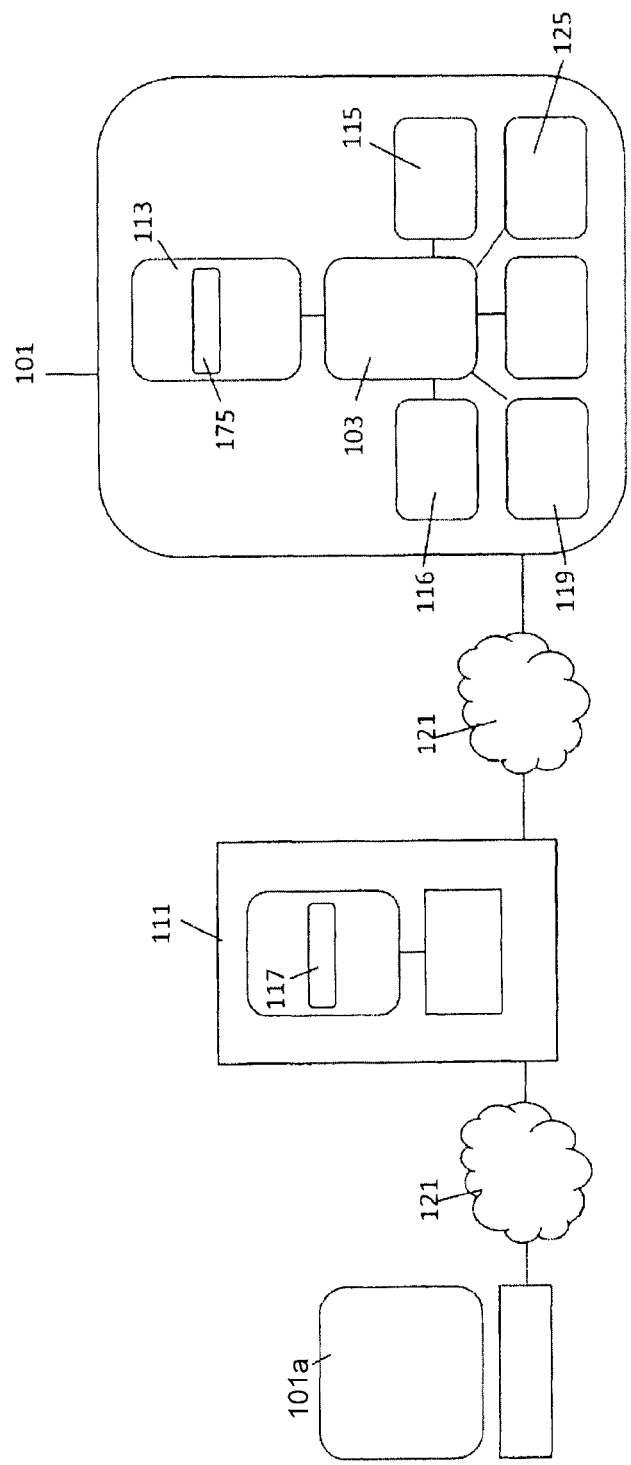
FIG. 1 is a block diagram illustrating an exemplary system for providing an application to an electronic device according to an embodiment.

It should be appreciated that the present invention can be implemented in numerous ways, including as a process, an apparatus, a system, a device, a method, or a computer readable medium such as a computer readable storage medium containing computer readable instructions or computer program code, or a computer network wherein computer readable instructions or computer program code are sent over optical or electronic communication links. Applications, software programs or computer readable instructions may be referred to as components or modules. Applications may take the form of software executing on a general purpose computer or be hardwired or hard coded in hardware. Applications may also be downloaded in whole or in part through the use of a software development kit, framework, or toolkit that enables the creation and implementation of the present invention. In this specification, these implementations, or any other form that the invention may take, may be referred to as techniques. In general, the order of the steps of disclosed processes may be altered within the scope of the invention.

Systems and methods are provided for providing an application to an electronic device in a secure environment. According to an embodiment, an application in an existing electronic device, referred to as a "source," can be cloned from the source electronic device to another electronic device, referred to as a "target." According to an embodiment, when the application is selected, the source device can be configured to automatically collect the selected application and configuration information, state information and/or application data associated with the selected application. The collected information is referred to as "cloning data." Once the cloning data is collected, the source device can be configured to transmit at least a portion of the cloning data to the target electronic device. The cloning data can be transmitted directly to the target electronic device, e.g., via a Bluetooth connection, or indirectly via an application provisioning service or an application store service.

According to an embodiment, when the cloning data is transmitted to an application store service or to an application provisioning service ("store service"), the store service can be configured to receive the cloning data and a request from the source device to clone the application to the target device. As mentioned above, the cloning data can include the selected application and configuration information, state information and/or application data associated with the selected application. In addition, the cloning data can include information identifying a type of device associated with the target device. The store service can be configured to determine that it supports a version of the application that is compatible with the target device and to transmit the compatible version of the application and the cloning data to the target electronic device.

In an embodiment, the target electronic device can be configured to receive cloning data associated with the application. The target device can receive the cloning data directly from the source electronic device, e.g., via a Bluetooth connection, or indirectly via the application provisioning service or the application store service. As noted above, the cloning data includes the application, and configuration information, state information, and/or application data. When the cloning data is received, the target device can be configured to determine that the application is compatible with the target device and to load the application using at least a portion of the cloning data. In addition, the configuration information and/or state information can be stored in an application file and the application data can be stored in a data store of the target electronic device.

According to an embodiment, the applications to be cloned to the target device are selected directly from the source device and therefore there is no need to log into the application store service and search for the applications. A compatible version of the selected application can be automatically provided to the target device along with the configuration and state information of the application at the source device. Thus, when the selected application is installed on the target device, the application can be configured to operate in the same manner as in the source device. Moreover, because the application data is also transmitted to and stored in the target device, the owner/user can use the application in the target device without any interruptions.

As used herein, the term "mobile electronic device" refers to mobile phones, tablets, PDAs and smartphones. The term "mobile electronic device" also refers to a class of laptop computers which run an operating system that is also used on mobile phones, tablets, PDAs, or smartphones. Such laptop computers are often designed to operate with a continuous connection to a cellular network or to the internet via a wireless link. Mobile electronic devices include devices for which wireless communication services such as voice, messaging, data, or other wireless Internet capabilities are a primary function. As used herein, a "mobile electronic device" may also be referred to as an "electronic device," "mobile device," "mobile client," or "handset." However, a person having skill in the art will appreciate that while the present invention is disclosed herein as being used on mobile electronic devices, the present invention may also be used on other computing platforms, including desktop, laptop, notebook, netbook, or server computers.

As used herein, the term "client computer" refers to any computer, embedded device, mobile device, or other system that can be used to perform the functionality described as being performed by the client computer. Specifically, client computers include devices which can be used to display a user interface by which the functionality provided by a server can be utilized by a user. Client computers may be able to display a web page, load an application, load a widget, or perform other display functionality that allows the client computer to report information from the server to the user and to receive input from the user in order to send requests to the server.

Prior to describing the subject matter in detail, a system in which the subject matter may be implemented shall first be described. Those of ordinary skill in the art will appreciate that the elements illustrated in FIG. 1 may vary depending on the system implementation. With reference to FIG. 1, the system can include mobile devices 101, 101a and a server 111. An exemplary mobile device 101 includes: an operating system 113, an input device 115, a radio frequency transceiver(s) 116, a visual display 125, and a battery or power supply 119. Each of these components is coupled to a central processing unit (CPU) 103. The device operating system 113 runs on the CPU 103 and enables interaction between application programs and the mobile device hardware components. In an embodiment, the mobile device 101 receives data through an RF transceiver(s) 116 which may be able to communicate via various networks, for example: Bluetooth, local area networks such as WiFi, and cellular networks such as GSM or CDMA.

In an embodiment, a local software component 175 is an application program that is downloaded to a mobile device and installed so that it integrates with the operating system 113. Much of the source code for the local software component 175 can be re-used between various mobile device platforms by using a cross-platform software architecture. In such a system, the majority of software functionality can be implemented in a cross-platform core module. The cross-platform core can be universal allowing it to interface with various mobile device operating systems by using a platform-specific module and a platform abstraction module that both interact with the mobile device operating system 113, which is described in U.S. patent application Ser. No. 12/255,626, entitled "SYSTEM AND METHOD FOR A MOBILE CROSS-PLATFORM SOFTWARE SYSTEM." In another embodiment, the local software component 175 can be device, platform or operating system specific.

The mobile device 101 accesses a communications network 121 which permits access to a server 111. The server 111 may also be accessed by another mobile device 101a via network 121. The network 121 will normally be the Internet but can also be any other communications network. Alternatively, the mobile device 101 may access the server 111 by a different network than the network the other mobile device 101a accesses the server 111. In an embodiment, the server 111 is provided with server software 117. The server software 117 on the server 111 provides functionality to allow two-way communication between the server 111 and the mobile devices 101, 101a through the network 121. The server software 117 allows data, such as location-related information, pictures, contacts, videos. SMS messages, call history, event logs, and settings to be transferred from the mobile device 101 to the other mobile device 101a and vice versa. In an embodiment, the server also includes a data store 179 that is used to store data, profile information, and other information.

Of course, it is understood by those of ordinary skill in the art that the functionality performed by server 111 does not necessarily have to be accomplished on a single hardware device. In this context, the use of the term server is intended to refer to one or more computers operating in cooperation or collaboration to provide the functionality described herein. The computers may be co-located or in different locations. The computers may inter-operate in such a way that portions of functionality are provided by separate services that may or may not be operated by the same entity as other computers which provide other functionality. For example, one set of servers may provide data storage functionality while another provides all other functionality. The data storage servers may be operated by a separate company than the servers that provide the other functionality. S3 (simple storage system), from Amazon, Inc. is such a data storage service which may be utilized by separate set of computers to enable the present invention.

It should be understood that the arrangement of electronic mobile device 101 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of mobile device 101. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the device, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

Figure 2:
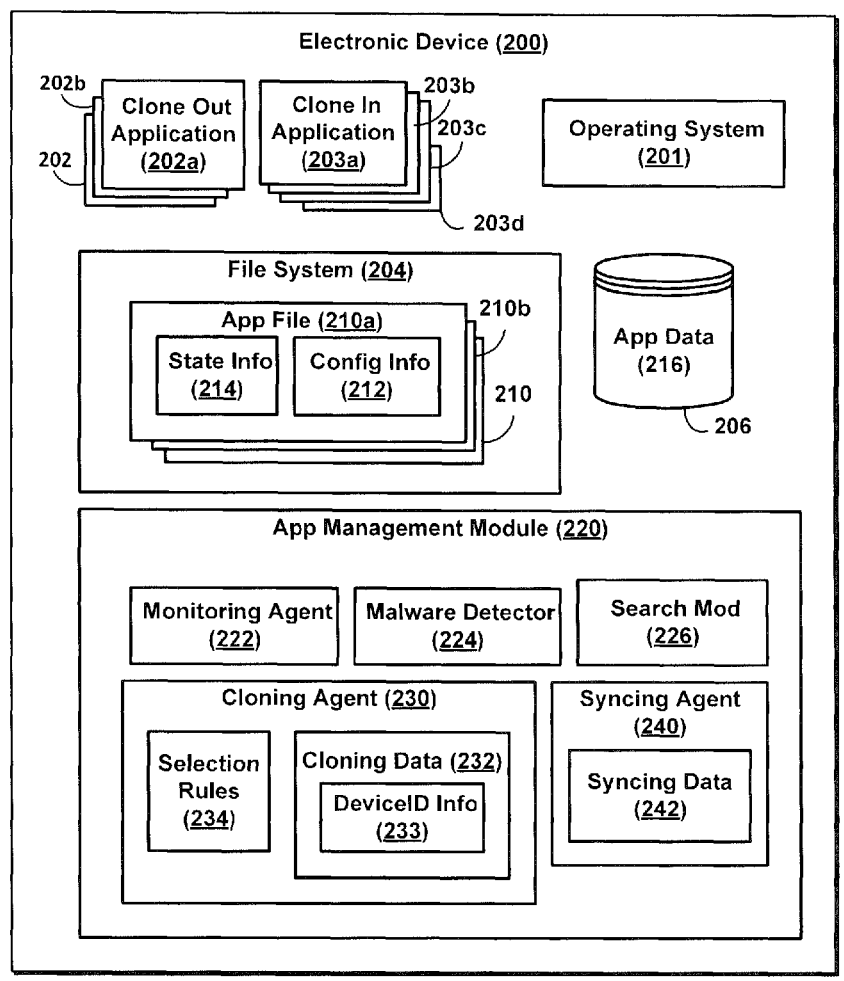
FIG. 2 a block diagram illustrating an exemplary electronic device according to an embodiment.

FIG. 2 is a more detailed block diagram of an exemplary electronic mobile device 200 having components, and/or their analogs, that are configured to provide and load an application to and on the electronic device according to an embodiment. The electronic device 200 can be configured to provide an execution environment configured to host at least one operating system 201, a plurality of applications 202, a file system 204, and a data store 206. In an embodiment, each of the plurality of applications 202 can include executable code, which when executed by a processor, e.g., the CPU 103, can provide a service or function of the electronic device 200.

According to an embodiment, each application, e.g., application 202a, can be associated with configuration information 212 and/or state information 214 that define operating parameters of the application 202a. In most cases, a user of the electronic device 200 can determine at least some of the application parameters to reflect the user's preferences. In an embodiment, the electronic device 200 can be used by more than one user, and although some of the applications 202 can be shared by multiple users, each user can define his or her personal configuration information 212 and/or state information 214 (collectively referred to as "application parameters") to reflect his or her personal preferences. Thus, each application 202a can be associated with one or more sets of application parameters. In an embodiment, the configuration 212 and state 214 information can be stored in an application file 210a associated with the application 202a and optionally associated with the user, and the application file 210a can be managed by the file system 204 of the electronic device 200. Data generated during the execution of the application 202a and metadata associated with the application 202a can be referred to as application data 216, which can be stored in the data store 206. In an embodiment, the metadata can include information identifying the application 202a, such as the application's name, publisher, version, and other identifying information.

In an embodiment, the device 200 can also support operation of an Application Management Module 220 that can be responsible for "cloning out" and "cloning in" an application and for synchronizing the application parameters, i.e., the configuration 212 and state 214 information, and the application data 216 once the application is installed and operating. According to an embodiment, the Application Management Module 220 can operate in the electronic device 200 as a client application hosted by the electronic device 200, as shown in FIG. 2. In another embodiment, the Application Management Module 220 can be provided by and integrated within the device's operating system 201. In either embodiment, the Application Management Module 220 can be configured to manage the application cloning and synchronization features described herein.

According to an embodiment, the Application Management Module 220 can include a cloning agent 230, and a syncing agent 240. The cloning agent 230 can be configured to clone out an existing application 202a and to clone in a new application 203a; the syncing agent 240 can be configured to sync out existing information relating to an application 202a, and to sync in new information relating to another application 202b. According to an embodiment, the electronic device 200 can be a "source" device or a "target" device. When the device is a "source" electronic device 200, the cloning agent 230 can be configured to "clone out" an existing application, e.g., 202a, to another device, i.e., the "target" electronic device 200.

Figure 3:
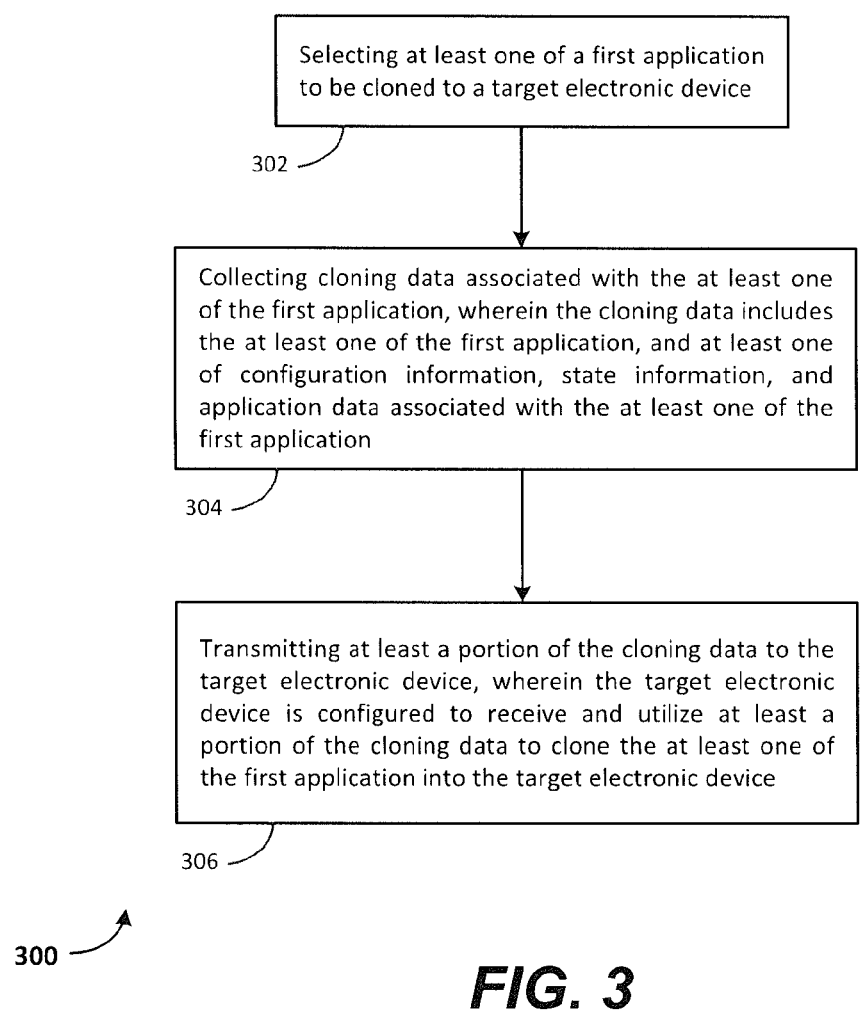
FIG. 3 is an operational flow diagram illustrating an exemplary method for cloning out an application according to an embodiment.

Referring now to FIG. 3, a flow diagram is presented illustrating a method 300 for cloning out an application from a source electronic device to a target electronic device according to an embodiment. The exemplary electronic device 200 illustrated in FIG. 2 includes an arrangement of components configured to implement the method 300, which also can be carried out in environments other than that illustrated in FIG. 2.

In an embodiment, the method 300 begins, in block 302, when the cloning agent 230 in the source electronic device 200 selects at least one of a first application, e.g., 202a, to be cloned to a target electronic device. For example, in an embodiment, a user associated with the source electronic device 200 can be permitted to select the first application(s) 202a to be cloned to the target device. Upon receiving a request to clone out from the user, the cloning agent 230 can be configured to display at least some of the applications 202 hosted by the device 200 to the user on the visual display, e.g., 125. For example, when the user is one of many users associated with the source device 200, the applications 202 displayed to the user can include those that are specifically associated with the user, or if requested, those that are associated with other users or all users associated with the source device 200a. In this case, the user can be an administrator of the source device 200. The user can then provide an indication selecting the first application(s) 202a from the displayed applications 202, and the cloning agent 230 can receive that indication via the input device, e.g., 115. In an embodiment, when several users are associated with the target device as well, the user can also identify to which of those target users the selected first application(s) 202a should be cloned. For example, each user registered on the source device 200 and/or the target device can be identified by a username, and the user can identify the target users by their respective usernames.

According to an embodiment, the user can select the first application(s) 202a based on the user's opinion on the application's suitability for a particular utility or function, and/or on its suitability for a particular type of target device. For instance, the selected first application(s) 202a can be a set of applications 202 that are particularly relevant for a phone, a tablet, a desktop, a laptop or a music player. Alternatively, or in addition, the set of applications 202 can be particularly relevant for photography, office management, or diet and fitness. In another embodiment, the application set 202 can be particularly relevant for a group of users, such as for example, science students or travelers to India.

Referring again to FIG. 3, when the first application(s) 202a is selected, cloning data 232 associated with the selected application(s) 202a is collected in block 304. The cloning data 232 includes any information/data needed to clone in the first application(s) 202a at the target device. For example, in an embodiment, the cloning data 232 can include the first application(s) 202a, and its configuration 212 and/or its state 214 information, and/or its application data 216.

According to an embodiment, when the user is one of many users associated with the source device 200a, the cloning data 232 collected can be associated with the user by default. For example, the application parameters 212, 214 of the first application 202a can be particular to the user's preferences and not necessarily particular to those of another user associated with the source device 200. Similarly, the application data 216 can be related to the user's activities and not to the activities of other users. In another embodiment, when the first application(s) 202a is to be cloned for more than one or all of the users associated with the source 200 and/or target device, the cloning data 232 collected can include the first application 202a and the application parameters 212, 214 and/or the application data 216 associated with some or all of the users.

In an embodiment, the cloning agent 230 can be configured to collect the cloning data 232 associated with a selected first application 202a by monitoring, via a monitoring agent 222, the read/write activity of the application 202a at execution time when the user and/or other users are using the first application 202a. For example, the monitoring agent 222 can be configured to determine to which application file(s) 210 in the file system 204 the application 202a is reading/writing, and to which location(s) in the data store 206 the application 202a is reading/writing. An exemplary system for monitoring a file system to determine to which file(s) an application is writing is described in co-pending U.S. patent application Ser. No. 13/710,162, entitled "METHOD AND APPARATUS FOR ENHANCED FILE SYSTEM MONITORING ON MOBILE COMMUNICATIONS DEVICES." By monitoring in this manner, the cloning agent 230 can determine the application file 210a associated with the application 202a and optionally associated with the user when more than one user is associated with the device 200, and can also determine where in the data store 206 the application data 216 for the application 202a is stored. Once that is determined, the cloning agent 230 can retrieve the configuration 212 and/or the state 214 information from the application file 210a associated with the application 202a, and/or retrieve the application data 216 associated with the application 202a and optionally associated with the user from the data store 206.

Alternatively or in addition, the selected application can be a self-cloning application 202b. In this embodiment, the self-cloning application 202b includes executable code for automatically collecting cloning data 232 associated with the self-cloning application 202b and optionally associated with the user(s). In an embodiment, when the cloning agent 230 submits a clone request to the self-cloning application 202b, the self-cloning application 202b can be configured to automatically collect the application parameters 212, 214 from the application file(s) 210a associated with the application 202b, and/or retrieve the application data 216 associated with the application 202b from the data store 206, and to provide the information and/or data to the cloning agent 230.

According to an embodiment, when the cloning data 232 is collected, the cloning agent 230 can be configured to scan the first application 202a for malicious programming code. In this case, for example, the application management module 220 can include a malware detector component 224 that is configured to scan the first application's executable code to ensure that the first application 202a is free from harmful viruses and other malicious programs. If malicious code is detected, the malware detector component 224 can notify the cloning agent 230 and the clone out process can be terminated.

Figure 4A:
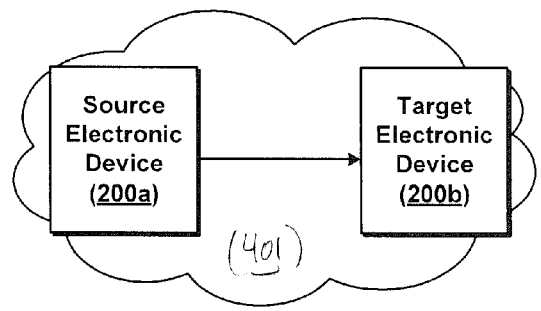
FIG. 4A illustrates an exemplary system for providing an application to an electronic device according to an embodiment.

Referring again to FIG. 3, once the cloning data 232 is collected and optionally scanned for malware, at least a portion of it is transmitted to the target electronic device in block 306. As is shown in FIG. 4A, the cloning data 232 can be transmitted directly from the source electronic device 200a to the target electronic device 200b using, for example, near field communication ("NFC") standards, and/or via a network 401. In an embodiment, the network 401 can be a "wi-fi" or wireless local area network ("WLAN"), or a piconet. For example, when the network 401 is a piconet, the cloning data 232 can be transmitted to the target device 200b using Bluetooth wireless technology over the piconet 401. According to an embodiment, the piconet 401 can have a range of up to 100 meters depending on the class of the radio used in implementation. In a typical mobile device 200, a class two radio is used, which has a range of 10 meters. Bluetooth wireless technology is well known to those skilled in the art and is utilized in numerous consumer devices, including medical devices, tablet computers, electronic accessories, mobile phones and smartphones. Detailed information relating to Bluetooth technology and the core specification can be found at www.Bluetooth.com.

Figure 4B:
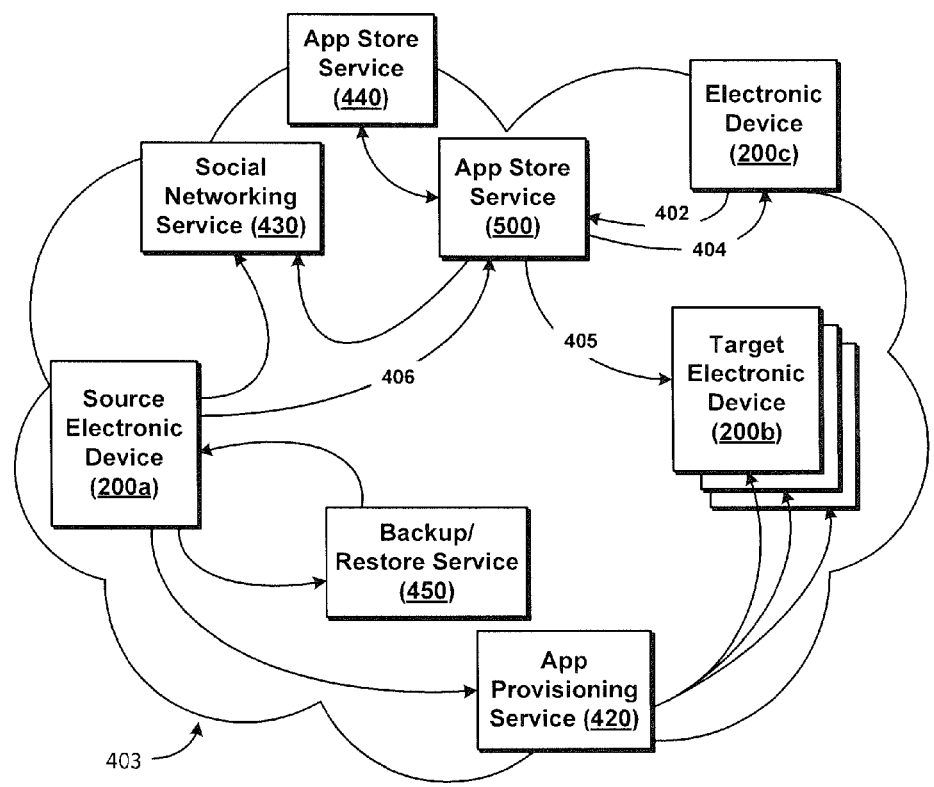
FIG. 4B illustrates another exemplary system for providing an application to an electronic device according to another embodiment.

Alternatively or in addition, as shown in FIG. 4B, the cloning data 232 can be transmitted over a network 403 from the source electronic device 200a to the target electronic device 200b via a cloud-based application provisioning service 420. For instance, this may be advantageous when, in an embodiment, the first application(s) 202a are cloned out to more than one target electronic device 200b. In this case, the application provisioning service 420 can be configured to receive the cloning data 232 from the source device 200a and configured to provide at least a portion of the cloning data to more than one target device 200b based on, for example, the device type of the target devices 200b. For example, when the first application(s) 202a is an application set 202 particularly suitable for phones, the application provisioning service 220 can provide the cloning data 232 to more than one target phone 200b, i.e., phones for employees, and each target phone 200b can use at least a portion of the cloning data 232 to clone in the application set 202.

According to another embodiment, the cloning data 232 can be transmitted to a social networking service 430 and/or an application store service 500 configured to publish at least a portion of the cloning data 232 to a community of users subscribed to the social networking service 430 and/or the application store service 500. In this case, the user associated with the source device 200a can provide comments about why the application set 202 is particularly useful for a function and/or device type, e.g., a phone, tablet or laptop, or about how the application(s) 202 are optimized when configured with a portion of the cloning data 232. These comments can be included in the cloning data 232 transmitted to the social networking service 430 and/or the application store service 500 so that the user can share his or her opinions with the community of subscribed users.

When the user is an expert in the field or is otherwise influential, these comments can persuade other users to download the cloning data 232 associated with the application set 202. In an embodiment, when the application store service 500 receives a request 402 to download the cloning data 232 from another electronic device 200c associated with another user, the application store service 500 can provide a packet 404 including at least a portion of the requested cloning data 232 associated with the application set 202 to the other electronic device 200c.

According to another embodiment, the cloning data 232 can be transmitted to a backup/restore service 450 configured to store the cloning data 232 as a backup copy in case the first application(s) 202a, the configuration 212 and state 214 information, and the application data 216 need to be restored. For example, if the source device 200a crashes or the first application(s) 202a on the source device 200a becomes infected and must be removed, the source device 200a can retrieve the stored cloning data 232 from the backup/restore server 450 and reload the first application(s) 202a using the stored application parameters, e.g., the configuration 212 and state 214 information, and application data 216.

According to an embodiment, the cloning data 232 associated with the first application(s) 202a or with the application set 202 can be transmitted directly or indirectly to the target device 200b. In an embodiment, when the first application(s) 202a is compatible with the target device 200b, i.e., can be run on the target device 200b "as is," the target device 200b can utilize at least a portion of the cloning data 232 to clone in the first application(s) 202a. Compatibility can be determined in several ways. For example, an application 202a can be compatible with the target device 200b when the source 200a and the target 200b have identical hardware components and identical operating systems 201 of the same version. On the other hand, when the source 200a and the target 200b have identical hardware components and the same but different versions of an operating system, the target device 200b may not be able to run the application 202a running on the source 200a and therefore, the application 202a may not be compatible with the target device 200b. In an embodiment, compatibility specifications for an application 202a can be determined from an application store service 500 that provides the application 202a or from a publisher of the application. Such requirements can specify, for example, the types of hardware devices capable of running the application 202a, minimum storage requirements, and/or particular versions of one or more operating systems.

According to an embodiment, when the first application(s) 202a is not compatible with the target device 200b, the first application(s) 202a cannot be cloned in "as is." In this case, a version of the first application(s) that is compatible with the target device 200b must be provided to the target device 200b.

Figure 5:
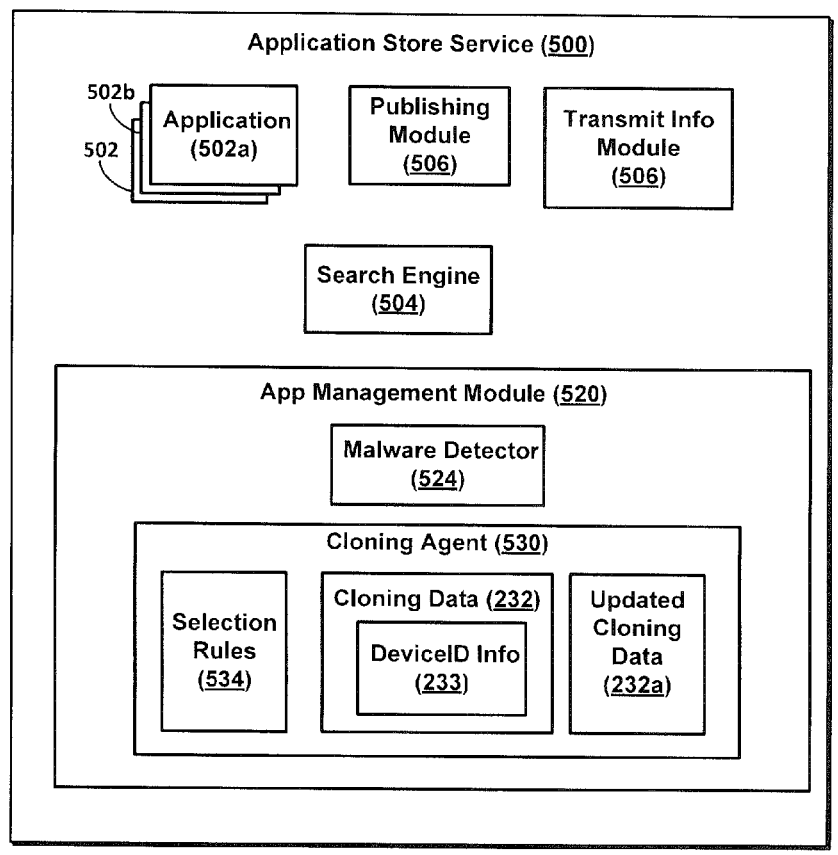
FIG. 5 a block diagram illustrating an exemplary application store service according to an embodiment.

According to an embodiment, the Application Store Service 500 can be configured to provide application cloning support when the first application(s) 202a is not compatible with the target device 200b. FIG. 5 is a block diagram of an exemplary Application Store Service 500 configured to provide an application to an electronic device according to an embodiment. In an embodiment, the Application Store Service 500 can operate in an execution environment provided by a server, such as the server 111 described earlier in FIG. 1. The Application Store Service 500 is configured to store and to provide a plurality of applications 502 including different versions of an application 502a. For instance the Application Store Service 500 can have a first version of an application for use on a phone and another version of the application for use on a tablet.

According to an embodiment, the Application Store Service 500 typically receives and processes requests from devices, e.g., device 200c, to download applications 502. For example, a search engine 504 in the Service 500 can receive a search query seeking applications 502 and can be configured to identify applications 502 that satisfy the query. When the search results are provided to the device 200c, the Application Store Service 500 can receive, from the device 200c, a request 402 to download an application 502a from the search results, and can retrieve and serve the requested application 502a to the electronic device 200c.

According to an embodiment, in addition to handling download requests, the Application Store Service 500 can be configured to support application cloning when the application(s) 202a from the source device 200a is incompatible with the target device 200b. In an embodiment, the Application Store Service 500 can support operation of an Application Management Module 520, which can include a cloning agent 530 that is responsible for cloning an application 502 between the source 200a and the target 200b devices.

Referring now to FIG. 6, a flow diagram is presented illustrating a method 600 for cloning an application from a source electronic device 200a to a target electronic device 200b from a perspective of the Application Store Service 500 according to an embodiment. The method 600 begins, in block 602, when the cloning agent 530 receives from a source electronic device 200a a request 406 to clone at least one application, e.g., 202a, to a target electronic device 200b. The request 406 can include cloning data 232 associated with the at least one application 202a. In an embodiment, the cloning data 232 can include information identifying the target electronic device 233, the at least one application 202a, and at least one of configuration information 212, state information 214, and application data 216 associated with the at least one application 202a.

According to an embodiment, the cloning agent 530 in the Application Management Module 520 can be configured to receive the request 406 and the cloning data 232 and to parse the cloning data 232 to extract the application(s) 202a, the information identifying the target device 233, and the configuration 212 and/or state 214 information and/or the application data 216 associated with the application(s) 202a. According to an embodiment, the information identifying the target device 233 can include the target's name, and optionally its hardware specifications. For example, the device identifying (ID) information 233 can identify the device's processor, memory capacity, and operating system.

According to an embodiment, the application(s) 202a can be an application set 202 associated with a particular utility function and/or a particular device type. In this case, when the cloning data 232 includes the user's comments concerning the application set 202, the comments can be published by the Application Store Service 500 to the community of users who are subscribed to receive such comments from the Service 500. In an embodiment, a publishing module 506 in the Application Store Service 500 can push the user's comments and information identifying the application set 202 to the community of users or to the social networking service 430. As noted above, when another user is interested in downloading the application set 202, e.g., based on the user's comments, the Application Store Service 500 can receive a request 402 from the other user's device 200c to download at least a portion of the application set 202 and can transmit the application set 202 and at least a portion of the cloning data 232 to the other user's device 200c. For example, the application store service 500 can remove any personal identifying information ("PII") from the cloning data 232 and provide the remaining data to the other user's device 200c. Any required PII for application operation can be provided by the other user at the time the application set 202 is installed at the other user's device 200c.

Referring again to FIG. 6, when the request to clone 406 the application(s) 202a is received, the cloning agent 530 can be configured to determine, in block 604, that the Application Store Service 500 provides a version of the application(s) 502a that is compatible with the target electronic device 200b. According to an embodiment, for example, the cloning agent 530 can be configured to use the information identifying the target device 233 to generate a search query for a version of the application(s) 202a that is compatible with the target device 200b. In an embodiment, the search query can be provided to the search engine 504, which can be configured to retrieve any applications 502 that satisfy the query.

In an embodiment, when the search engine 504 returns the compatible version(s) 502a of the application(s) 202a to the cloning agent 530, the cloning data 232 can be updated by replacing the incompatible application(s) 202a with the compatible version(s) of the application(s) 502a in block 606. An updated cloning data 232a can then be transmitted to the target electronic device 200b in block 608. In an embodiment, the Application Store Service 500 can include a transmit information module 506 configured to generate a response 405 that includes the updated cloning data 232a, and to transmit the response 405 over the network 403 to the target device 200b.

Alternatively, or in addition, the cloning agent 530 can be configured to determine that a compatible version of the application(s) 502a is available but not provided by the Application Store Service 500. In this case, another application store service 440 can be a standard application store, i.e., not configured to support the inventive cloning and syncing features described herein, that provides the compatible version of the application(s) 502a. In an embodiment, the cloning agent 530 can be configured to identify the other application store service 440 that provides the compatible version(s) of the application(s) 202a. For example, a directory of application store services and/or websites that allow application downloads can be provided to the search engine 504, and the search engine 504 can query the application store services 440 and/or the websites for the compatible version. In another embodiment, the application 202a itself can provide information identifying the application store service 440 that provides the compatible version. Alternatively, or in addition, the application's publisher can provide such information. In another embodiment, the user associated with the source device 200a or an administrator managing the clone operation can provide the information identifying the other application store service 440.

Once the other application store service 440 is identified, the cloning agent 530 can transmit a request to the other store service 440 to retrieve the compatible version(s) 502a of the application(s) 202a. When received, the cloning data 232 can be updated with the compatible version(s) 520a of the application(s) and the updated cloning data 232a can be transmitted to the target electronic device 200b. Alternatively, the Application Store Service 500 can log-in to a web interface provided by the other application store service 440, register the target device 200b, if necessary, and select and push the compatible version of the application(s) 502a to the target device 200b.

In another embodiment, the cloning agent 530 can be configured to determine that a compatible version of the application(s) 502a is unavailable. In this case, the cloning agent 530 can be configured to identify at least one substitute application 502b similar to the at least one application 202a. According to an embodiment, for example, the cloning agent 530 can be configured to search for and to retrieve a plurality of potential substitute applications that have similar titles, similar descriptions, and similar function. The cloning agent 530 can be configured to identify the substitute application(s) 502b from the potential applications by applying at least one selection rule 534 defining parameters for selecting a similar but different substitute application 502b for an original application 202a. In an embodiment, the selection rule(s) 534 can be defined by the user associated with the source device 200a and/or the Application Store Service 500.

For example, in an embodiment, a selection rule 534 can be based on a degree of similarity between the textual descriptions of the substitute application's functionality and the original application's functionality. Alternatively or in addition, a selection rule 534 can be based on the degree of similarity between the names of the substitute and original applications. In an embodiment, a selection rule 534 can require that the substitute application 502b be published by the same publisher of the original application 202a. In another embodiment, a selection rule 534 can consider the popularity and/or reputation and/or reviews information associated with the substitute application 502b, and/or whether the substitute application 502b is free or requires a fee. In another embodiment, a selection rule 534 can be based on whether the substitute application 502b and the original application 202a are grouped into the same category.

According to an embodiment, the selection rules 534 can be ranked and/or weighted by importance so that a most suitable substitute application 502b can be identified. For example, when the original application 202a is a game created by a game developer, the cloning agent 530 can give preference to potential applications of the same name; then to other applications by the game developer; and then to other applications with similar text descriptions. In an embodiment, once the substitute application(s) 502b have been identified and retrieved, the cloning data 232 can be updated with the substitute application(s) 502a, and the updated cloning data 232a can be transmitted to the target electronic device 200b. Alternatively or additionally, a plurality of potential substitute applications 502 can be identified, e.g., using the selection rule(s) 534, and presented to the source device's user and the user can be allowed to select the substitute application(s) 502a.

According to an embodiment, to ensure the security of the target device 200b and/or its user, the cloning agent 530 can be configured to scan the compatible and/or substitute application(s) 502a, 502b for malicious programming code prior to transmitting the updated cloning data 232a to the target device 200b. In this case, for example, the Application Management Module 520 can include a malware detector component 524 that is configured to scan an application's executable code to ensure that an application 502a, 502b is free from harmful viruses and other malicious programs. If malicious code is detected, the malware detector component 524 can notify the cloning agent 530 and the process can be terminated. Otherwise, the updated cloning data 232a is transmitted to the target device 200b where the target device 200b can be configured to use at least a portion of the cloning data 232a to clone in the compatible version(s) of the application(s) 502a and/or substitute application(s) 502b onto the target device 200b.

According to an embodiment, the electronic device 200 illustrated in FIG. 2 and described above as behaving as a source device 200a can now be described as behaving as a target device 200b. When the electronic device 200 is a target device 200b, the cloning agent 230 can be configured to "clone in" a new application, e.g., 203a, from another device, i.e., the source device 200a. Referring now to FIG. 7, a flow diagram is presented illustrating a method 700 for cloning in an application from the source electronic device 200a to the target electronic device 200b according to an embodiment. The exemplary electronic device 200 illustrated in FIG. 2 includes an arrangement of components configured to implement the method 700, which also can be carried out in environments other than that illustrated in FIG. 2.

Referring to FIG. 2 and FIG. 7, the method 700 begins, in block 702, when the cloning agent 230 receives cloning data 232 associated with at least one application to be cloned-in to the electronic device 200 (referred to as a "clone-in application" 203). As described above, the cloning data 232 can include the clone-in application(s) 203a, and at least one of configuration information 212, state information 214, and application data 216 associated with the at least one clone-in application 203a. According to an embodiment, the clone-in application(s) 203a can be received directly from the source device 200a via a network 401 and/or indirectly from the cloud-based Application Provisioning Service 420 and/or the Application Store Service 500.

In an embodiment, when the cloning data 232 is received, the cloning agent 230 can be configured to ensure that the target device 200b is authorized and/or prepared to clone in the application(s) 203a. For example, as mentioned above, the user of the source device 200a can be one of several users associated with the source 200a, and the cloning data 232 can be associated with the user and/or with many users. According to an embodiment, the cloning agent 230 can be configured to determine that the user(s) associated with the source device 200a is also registered with the target device 200b. For example, each user can be identified by a username, and the cloning agent 230 can determine that each user's username is registered on the target device 200b. When a username of the user and/or of the other users is not registered, for example, because the target device 200b is a new device, the cloning agent 230 can notify the user associated with the source device 200a and/or terminate the clone-in process. Alternatively, the cloning agent 230 can create new user(s) on the target device 200b corresponding to the unregistered user(s).

According to an embodiment, when the cloning data 232 is received, the cloning agent 230 can be configured to determine, in block 704, that the at least one application 203a is compatible with the target electronic device 200b and to prepare to load or install the application(s) 203a onto the device 200b. In an embodiment, in preparation for loading, the cloning agent 230 can invoke the malware detector 224 to scan the clone-in application(s) 203a for malicious programming code to protect the electronic device 200b and/or its user(s). If a virus or other malicious code is detected, the cloning agent 230 can issue an alert and terminate the clone-in process. Otherwise, the clone-in application(s) 203a can be loaded, in block 706, onto the device 200b.

Alternatively or in addition, in another embodiment, the cloning agent 230 can determine that the application(s) 203a is incompatible with the target electronic device 200b. For example, when the Application Store Service 500 is not available, the cloning data 232 received from the source device 200a can include a clone-in application 203a that is incompatible with the target device 200b. According to an embodiment, the cloning agent 230 can be configured to determine that a compatible version 203b of the at least one application is available from, for example, an application store service 440. In an embodiment, the Application Management Module 220 can include a search module 226 that can be configured to query application store services 440 and websites for the compatible version 203b of the application. In this regard, the search module 226 can be similar to the Application Store Service's search engine 504 described above. The cloning agent 230 can then transmit a request to the application store service 440 for the compatible version of the application 203b, via the search module 226, and can download and install the compatible version of the application 203b.

Alternatively or additionally, in another embodiment, when the clone-in application 203a is incompatible and a compatible version of the application is unavailable, the cloning agent 230 can be configured to identify a substitute application 203c similar to the incompatible clone-in application 203a. According to an embodiment, similar to the Application Store Service's cloning agent 530 described above, the cloning agent 230 can be configured to identify the substitute application(s) 203c by applying at least one selection rule 234 defining parameters for selecting a similar but different substitute application 203c for an original incompatible clone-in application 203a. In an embodiment, the selection rule(s) 234 can be defined by the user associated with the source device 200a and/or the user associated with the target device 200b if different from the source's user.

In an embodiment, the selection rule(s) 234 in the electronic device 200 can be similar to those in the Application Store Service 500 described above. For instance, a selection rule 234 can be based on a degree of similarity between the textual descriptions of the substitute application's functionality and the original application's functionality. Alternatively or in addition, a selection rule 234 can be based on the degree of similarity between the names of the substitute and original applications. In an embodiment, a selection rule 234 can require that the substitute application 203c be published by the same publisher of the original application 203a. In addition, the selection rules 234 can be ranked and/or weighted by importance so that a most suitable substitute application 203c can be identified. Once the substitute application 203c is identified, the cloning agent 230 can retrieve the application 203c if it is stored locally or transmit a request to an application store service 440 for the substitute application 203c and can download and install the substitute application 203c.

According to an embodiment, the cloning agent 230 can be configured to install the clone-in application(s) 203a, the compatible version of the clone-in application(s) 203b, and/or the substitute application(s) 203c and, using the configuration information 212, the state information 214, and/or the application's application data 216 included in the cloning data 232, can configure the application(s) 203b, 203c according to the preferences of the user(s). In an embodiment, the installation process can be performed silently, i.e., without interaction with the user of the target device 200b. Alternatively, the installation can involve minimal interaction with the user of the target device 200b.

In another embodiment, a clone-in application can be a self-cloning application 203d. In this embodiment, the self-cloning application 230d includes executable code for automatically configuring itself using at least a portion of the cloning data 232 associated with the self-cloning application 203d. In an embodiment, when the cloning agent 230 submits a load request to the self-cloning application 203d, the self-cloning application 202b can be configured to automatically configure itself for the user and/or for some or all of the users using the configuration 212 and/or the state 214 information and/or the application data 216 associated with the application 203d and associated with the user, and/or some and/or all of the users.

Referring again to FIG. 7, once the clone-in application 203a is loaded and configured, the cloning agent 230 can be configured to store, in block 708, the configuration information 212 and/or the state information 214 in an application file 210b and to store the application's application data 216 in the data store 206 of the electronic device 200. In an embodiment where the clone-in application is the self-cloning application 203d, the self-cloning application 203d be configured to modify the application file 210b and the application data 216 in the data store 206. In an embodiment where the clone-in application 203a is loaded and configured for multiple users registered in the target device 200b, the application file 210b associated with the clone-in application 203a can be divided into subfiles (not shown) associated with each of the user(s) registered on the target 200b device. In this case, the configuration 212 and/or the state 214 information can be stored in the subfile corresponding to each of the users.

According to an embodiment, once a selected application is cloned from the source device 200a to the target device 200b, both devices host the application and, at least initially, share the same configuration information, state information and application data. As noted above, much of this process can be performed with little or no user input beyond selecting the application to be cloned and optionally indicating for which users. As time passes and the application is used at various times on the two devices, the configuration information, state information and application data can change between the two devices. For example, when the user plays a game application on his phone and completes a difficult level, the execution history of the application on the phone reflects that the user is ready for the next level. Accordingly, when the user plays the game again on his phone, he is moved to the next level and is not required to replay previously completed levels. Nevertheless, when the user plays the same game application on his tablet and the execution history of the application on the tablet does not reflect that the user has completed the difficult level, he will be required to replay this difficult level before going on to the next level.

As mentioned above, the Application Management Module 220 is not only capable of "cloning out" and "cloning in" an application, it can also be responsible for synchronizing application parameters, i.e., the configuration 212 and state 214 information, and the application data 216 once the application is installed and operating. According to an embodiment, the Application Management Module 220 can include a syncing agent 240 configured to sync out existing information relating to an application 202a and optionally associated with the user, and to sync in new information relating to another application 202b.

In a sync-out mode, the electronic device 200 can be a source device 200a and the syncing agent 240 can select an application 202 to be synchronized with a corresponding application hosted by a target device 200b. In an embodiment, when the application 202 is selected, the syncing agent 240 can be configured to collect syncing data 242 associated with the application 202 including the configuration information 212, the state information 214, execution history information, and the application data 216. In an embodiment, the user can determine at least some of the information collected by the syncing agent 240. In another embodiment, the syncing data 242 can be formatted in a platform independent format so that the data 242 can be interpreted by any type of device. Once the syncing data 242 is collected, the syncing agent 240 can transmit the syncing data 242 to the target electronic device 200b, which can be configured to receive and sync-in the syncing data 242.

In a sync-in mode, the electronic device 200 is the target device 200b and the syncing agent 240 is configured to receive syncing data 242 associated with an application 202 hosted by the target electronic device 200b. According to an embodiment, the syncing data 242 can be received directly from a source device 200a and/or from the cloud-based Application Provisioning Server 420. When the syncing data 242 is received, the syncing agent 240 can be configured to update the configuration information 212, the state information 214, execution history information, and/or the application data 216 associated with the application 202 with the syncing data 242.

In other embodiments, the syncing agent 240 can use file system information to perform well known file replication techniques across the devices 200a, 200b, where the files are application files 210 which contain the content, execution history information, and/or state 214 or configuration information 212, to accomplish the data synchronization. In addition, when such information is application data 216 stored in a database 206 rather than in files 210, well known database replication techniques can be used.

According to an embodiment, when the syncing data 242 is transmitted to the target device 200b, the syncing data 242 can also be transmitted to the backup/restore service 450, which can be configured to store the syncing data 242 with the corresponding cloning data 232 associated with the application 202. If necessary, the syncing agent 240 of the source 200a or the target 200b device can be configured to retrieve the syncing data 242 from the backup/restore service 450 and to perform the sync in operation to implement a full or partial restore operation.

According to an embodiment, the cloning agent 230 and the syncing agent 240 can be configured by the user to clone or sync all or a few applications 202 frequently or occasionally. For example, the user can say "clone everything but don't sync" or "clone everything and keep everything in sync" or "clone these apps but not those" or "sync these but not those" or any combination of these options. In another embodiment, an administrator can use the cloning 230 and syncing 240 agents to create standard configurations of multiple different devices. In another embodiment a device store can use the cloning 230 and syncing 240 agents to provision a newly purchased additional or replacement device for a user.

These and other advantages can be provided by the inventive system described above. For example, in an embodiment, an application to be cloned 202a can be the operating system 201 of the source device 200a. In this case, the cloning agent 230 can be configured to replace the operating system 201 of the target device 200b to implement an operating system upgrade to a new release, and/or to implement a rollback to an earlier version of the operating system when the newer version has detected problems.

In another embodiment, as mentioned above, the cloning data 232 and the syncing data 242 can be stored in the backup/restore service 450 and retrieved by the source 200a or target 200b device to perform a full or partial restore operation. This can also be implemented to handle a malware infestation, removal, and cleanup operation in the source 200a or target 200b device. For example, a piece of malware on the source device 200a may not be discovered and removed until after it has been on the device and operating for some time. During its lifetime, the malware may have modified other files or applications on the source device 200a. In this case, the cloning agent 230 can be configured to retrieve and clone in/sync-in the cloning 232/syncing 242 data from the restore service 450 to restore the application 202 to some previous time predating the infestation. In an embodiment, the backup/restore service 450 can be configured to store the cloning and syncing data, versioned, on a server to be available should a restore clone operation be necessary. Alternatively, the service 450 can be configured to operate a server-side version of the user's source device 200a, e.g., in a virtual machine or device emulator, so that the corresponding clone in/sync in operations are identical to those that would run on the target device 200b.

In another embodiment, if the source device 200a is lost, the user or an administrator can remotely initiate a clone out and/or sync out operation for a plurality of applications 202 on the lost device 200a. The user or administrator can choose the priority for performing the cloning or syncing operations so as to maximize, according to the user's or administrator's preferences, the likelihood of accomplishing the operations before the lost device's battery exhausts, or a stolen device is turned off. In an embodiment, the clone out and/or sync out operations may be immediately followed by wiping part or all of the application 202, the configuration information 212 or the state information 214 and/or the application data 216 on the lost device 200a.

In another embodiment, one or more applications being cloned may be applications which have been purchased by or on behalf of the user. The license for the applications may or may not allow such cloning. In an embodiment, in which the user is cloning for restore of a backup to the same or substantially identical replacement device, the clone in application 203a instance is replacing the originally clone out application 202a instance either physically (if this is the identical device from which the cloning occurred) or logically (the user will be having the application on just one device, the replacement). In this case the license for the application should allow the cloning to occur, but a replacement of some specific hardware identifier(s) possibly used in application configuration may be necessary, e.g., the IMEI (International Mobile Station Equipment Identity) number used on mobile phones.

Alternatively, in another embodiment, the application license may allow for the user to install and run the application on a specified number of devices. In this case; when the cloning operation is adding a new application instance to a device, it may be necessary to only allow the clone in operation if the current license count will not be exceeded. The license count can be verified by asking the user or an administrator, or by querying a license manager service (which may be on the local network for an enterprise or on the internet) if sufficient licenses exist to allow the clone in operation. In the event that a license is not available, then there is the option to present the user (or administrator performing the clone in operation) a dialog in which the user can perform a transaction to purchase a license to allow for the clone in operation to proceed. In an embodiment when multiple applications are being cloned in, the user may be presented in advance of any cloning operation with the equivalent of a shopping basket checkout dialog during which the user can choose to purchase the license or licenses necessary to allow the clone in operation to proceed. This latter scenario as enabled would allow the operation of a user purchasing an application via a clone out/clone in operation from a friend or co-worker. The dialog for obtaining the required license can be carried out in communication with one or more application stores, application publisher websites, or other authorized sources for purchasing the application.

Any of the above embodiments may be used alone or together with one another in any combination. The one or more implementations encompassed within this specification may also include embodiments that are only partially mentioned or alluded to or are not mentioned or alluded to at all. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

In addition, one will appreciate that in the description above and throughout, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for providing an application to an electronic device, the method comprising:

receiving, by a cloning agent in a target electronic device, cloning data associated with at least one application to be cloned into the target electronic device, wherein the cloning data includes the at least one application, and at least one of configuration information and application data associated with the at least one application, and state information associated with the at least one application, wherein the state information defines operating parameters of the application, and wherein the cloning data is received in response to a reception of a selection, at a cloning agent in a source electronic device hosting the at least one application, of the at least one application by a user;

determining, by the cloning agent, that the at least one application is compatible with the target electronic device;

loading, by the cloning agent, the at least one application using at least one of the configuration information and the application data associated with the at least one application, and the state information associated with the at least one application; and storing, by the cloning agent, at least one of the configuration information and the state information in an application file and storing the application data in a data store of the target electronic device.

2. The method of claim 1 further including determining that the at least one application is incompatible with the target electronic device.

3. The method of claim 2 further including determining, by the cloning agent, that a compatible version of the at least one application is available, transmitting a request for the compatible version of the at least one application to an application store service, and downloading the compatible version of the at least one application.

4. The method of claim 3 further comprising installing and configuring the compatible version of the at least one application using at least one of the configuration information and application data associated with the at least one application, and the state information associated with the at least one application.

5. The method of claim 2 further including determining, by the cloning agent, that a compatible version of the at least one application is unavailable, identifying at least one substitute application similar to the at least one application, and downloading the substitute application.

6. The method of claim 5 further comprising providing at least one selection rule, and wherein identifying the at least one substitute application includes applying the at least one selection rule.

7. The method of claim 1 wherein the target electronic device is associated with a plurality of users and wherein at least one of the configuration information and the application data associated with the at least one application, and the state information associated with the at least one application are also associated with the user.

8. The method of claim 7 further comprising using at least one of the configuration information and the state information to configure the at least one application according to preferences of the user.

9. The method of claim 1 wherein the at least one application is a licensed application and wherein prior to loading the licensed application, the method further comprises determining that the license prevents the application from being loaded onto the target electronic device.

10. The method of claim 9 further comprising facilitating a transaction to purchase a license for the application.

11. The method of claim 1 wherein the cloning data is received directly from the source electronic device.

12. The method of claim 1 wherein the cloning data is received from the source electronic device via at least one of a cloud based application provisioning service and an application store service.

13. The method of claim 1 wherein after loading the at least one application, the method further comprises providing, by the cloning agent, a load request to the at least one application, wherein in response to receiving the load request, the at least one application is configured to store at least one of the configuration information and the state information in an application file in a file system and to store the application data in an application data store.

14. The method of claim 1 wherein the cloning agent is provided by an operating system of the target electronic device.

15. The method of claim 1 wherein the cloning agent is an application hosted by the target electronic device.

16. The method of claim 1 wherein the at least one application is an operating system.

17. The method of claim 1 wherein the at least one application is an application set associated with at least one of a device type, a device platform type, and a utility function type.

18. The method of claim 1 further comprising:

receiving, by a syncing agent in the target electronic device, syncing data associated with an application hosted by the target electronic device, wherein the syncing data includes at least one of the configuration information, the state information, execution history information, and the application data associated with the application; and updating at least one of the configuration information, the state information, execution history information, and the application data associated with the application with the syncing data.

19. The method of claim 1 wherein prior to loading the at least one application, the method further comprises scanning the at least one application for malicious programming code.

20. A method for providing an application to an electronic device, the method comprising:

receiving, by a cloning agent in an application store service that provides a plurality of applications, a request to clone at least one application from a source electronic device to a target electronic device, the request including cloning data associated with the at least one application, wherein the cloning data includes information identifying the target electronic device, the at least one application, and at least one of configuration information and application data associated with the at least one application, and state information associated with the at least one application, wherein the state information defines operating parameters of the application, and wherein the request is received based on a selection, at a cloning agent in a source electronic device hosting the at least one application, of the at least one application by a user;

determining, by the cloning agent, that the application store service provides a compatible version of the at least one application compatible with the target electronic device;

updating the cloning data by replacing the at least one application with the compatible version of the at least one application; and transmitting, by the cloning agent, the updated cloning data to the target electronic device, wherein the target electronic device is configured to receive the updated cloning data and to utilize at least a portion of the updated cloning data to clone in the compatible version of the at least one application into the target electronic device.

21. The method of claim 20 further comprising:
determining, by the cloning agent, that a compatible version of the at least one application is unavailable;
identifying at least one substitute application similar to the at least one application; and
updating, by the cloning agent, the cloning data by replacing the at least one application with the at least one substitute application.

22. The method of claim 21 further comprising applying at least one selection rule to identify the at least one substitute application.

23. The method of claim 22 wherein the source electronic device is associated with a source user and wherein the at least one selection rule is defined by at least one of the source user and the application store service.

24. The method of claim 20 wherein the source electronic device is associated with a source user and wherein the request to clone is received from the source user.

25. The method of claim 24 wherein the at least one application is an application set associated with at least one of a device type and a utility function type, and wherein the cloning data further includes the source user's comments relating to the application set.

26. The method of claim 25 further comprising publishing, by the application store service the information identifying the set and the source user's comments to a community of users.

27. The method of claim 20 further comprising:
determining, by the cloning agent, that a compatible version of the at least one application compatible with the target electronic device is available but not provided by the application store service;
identifying, by the cloning agent, another application store service that provides the compatible version of the at least one application; and
transmitting a request to the other application store service to retrieve the compatible version of the at least one application to the target electronic device.

28. The method of claim 20 wherein the at least one application is an application set associated with at least one of a device type and a utility function type, the method further comprising:
receiving, by the cloning agent, a request from another electronic device to download the application set; and
transmitting at least a portion of the cloning data associated with the application set to the other electronic device.

29. The method of claim 20 wherein prior to transmitting the updated cloning data, the method further comprises scanning the compatible version of the at least one application for malicious programming code.

30. A method for providing an application to an electronic device, the method comprising:
receiving, at a cloning agent in a source electronic device hosting a plurality of applications, a selection of at least one of a first set of applications from a user;
collecting, by the source electronic device, cloning data associated with the at least one of the first set of applications, wherein the cloning data includes the at least one of the first set of applications, at least one of configuration information, and application data associated with the at least one of the first set of applications, and state information associated with the at least one of the first set of applications, wherein the state information defines operating parameters of the application; and
transmitting, by the cloning agent, at least a portion of the cloning data to a target electronic device, wherein the target electronic device is configured to receive and utilize at least a portion of the cloning data to clone the at least one of the first set of applications into the target electronic device.

31. The method of claim 30 wherein the at least one of the first set of applications is an application set associated with at least one of a device type and a utility function type.

32. The method of claim 31 further comprising transmitting, by the cloning agent in the source electronic device, the cloning data to a social networking service configured to publish at least a portion of the cloning data to a community of users subscribed to the social networking service.

33. The method of claim 31 further comprising transmitting, by the cloning agent in the source electronic device, the cloning data to a the cloud-based application provisioning service configured to provide the cloning data to at least one other target electronic device based on the device type associated with the set.

34. The method of claim 31 further comprising transmitting, by the cloning agent in the source electronic device, the cloning data to an application store service configured to provide at least a portion of the cloning data to an electronic device in response to receiving a request from the electronic device to download the cloning data associated with the application set.

35. The method of claim 30 further comprising transmitting, by the cloning agent in the source electronic device, the cloning data to a backup/restore service configured to store the cloning data associated with the at least one of the first set of applications.

36. The method of claim 35 further comprising removing the at least one of the first set of applications on the source electronic device; retrieving the cloning data associated with the at least one of the first set of applications from the backup/restore service, and using the cloning data to reinstall and configure the at least one of the first set of applications on the source electronic device.

37. The method of claim 30 wherein the source electronic device is associated with the user and wherein receiving a selection of the at least one of the first set of applications comprises displaying at least some of the plurality of applications to the user and receiving an indication from the user selecting the at least one of the first set of applications.

38. The method of claim 30 wherein the user is one of a plurality of users associated with the source electronic device and wherein when the at least one of the first set of applications is utilized by the user and at least one other user of the plurality of users, the at least one of configuration information and application data associated with the at least one of the first set of applications, and the state information associated with the at least one of the first set of applications are also associated with the user.

39. The method of claim 30 wherein the user is an administrator and a plurality of users is associated with the source electronic device, and wherein when the at least one of the first set of applications is utilized by at least some users of the plurality of users, the cloning data includes the at least one of the first set of applications, at least one of the configuration information and application data associated with both the at least one of the first set of applications and with the at least some users, and the state information associated with both the at least one of the first set of applications and with the at least some users.

40. The method of claim 30 wherein at least one of the configuration information and the state information is stored in an application file in a file system and the application data is stored in an application data store, and wherein collecting the cloning data comprises:
monitoring the at least one of the first set of applications' read/write activity;
determining to which application file in the file system and to which location in the application data store the at least one of the first set of applications' read/write activity is directed based on the monitoring; and
retrieving at least one of the configuration information, the state information and the application data from at least one of the determined application file in the file system and the determined location in the application data store.

41. The method of claim 30 wherein transmitting the cloning data to the target electronic device includes sending the cloning data from the source electronic device directly to the target electronic device.

42. The method of claim 30 wherein the cloning data further includes information identifying the target electronic device and wherein transmitting the cloning data to the target electronic device includes sending the cloning data from the source electronic device to the target electronic device via at least one of a cloud-based application provisioning service and an application store service.

43. The method of claim 30 wherein the cloning agent is provided by an operating system of the source device.

44. The method of claim 30 wherein the cloning agent is an application hosted by the source device.

45. The method of claim 30 further comprising submitting, by the cloning agent, a clone request to the at least one of the first set of applications, wherein in response to receiving the request, the at least one of the first set of applications is configured to collect the cloning data.

46. The method of claim 30 wherein the source electronic device further hosts an operating system, and wherein the at least one of the first set of applications is the operating system.

47. The method of claim 30 further comprising:
receiving, from the user at a syncing agent in the source electronic device, a selection of an application of the plurality of applications to be synchronized with a corresponding application hosted by the target electronic device;
collecting syncing data associated with the application, wherein the syncing data includes at least one of the configuration information, the state information, execution history information, and the application data associated with the application; and
transmitting, by the syncing agent, the syncing data to the target electronic device, wherein the target electronic device is configured to receive and utilize at least a portion of the syncing data to update at least one of the configuration information, the state information, execution history information, and the application data associated with the corresponding application.

48. The method of claim 30 wherein prior to transmitting the at least a portion of the cloning data, the method further comprises scanning the at least one the first set of applications for malicious programming code.

* * * * *